(12) United States Patent
Lin

(10) Patent No.: US 12,228,812 B1
(45) Date of Patent: Feb. 18, 2025

(54) HMI DEVICE OF AC/DC POWER SUPPLY OR CONTROLLER

(71) Applicant: Hong Liu Co., Ltd., Taichung (TW)

(72) Inventor: Mu-Chun Lin, Taichung (TW)

(73) Assignee: HONG LIU CO., LTD., Taichung (TW)

( * ) Notice: Subject to any disclaimer, the term of this patent is extended or adjusted under 35 U.S.C. 154(b) by 0 days.

(21) Appl. No.: 18/409,317

(22) Filed: Jan. 10, 2024

(51) Int. Cl.
*G02F 1/1333* (2006.01)
*H02M 7/00* (2006.01)

(52) U.S. Cl.
CPC ...... *G02F 1/133331* (2021.01); *H02M 7/003* (2013.01)

(58) Field of Classification Search
None
See application file for complete search history.

(56) References Cited

U.S. PATENT DOCUMENTS

2022/0200303 A1\* 6/2022 Swamy ................. H02J 7/0063

\* cited by examiner

*Primary Examiner* — Richard H Kim
(74) *Attorney, Agent, or Firm* — Sinorica International Patent & Trademark

(57) ABSTRACT

A human-machine interface device of an AC/DC power supply or controller includes a human-machine interface module and a film. The human-machine interface module is mounted on a panel of the AC/DC power supply or controller. A front of the human-machine interface module has a liquid crystal display. The film is located in front of the human-machine interface module and attached to the panel of the AC/DC power supply or controller. The film has a transparent window corresponding to the liquid crystal display. The film further has a status indication region adjacent to an outer side of the window. The status indication region is marked with a plurality of different status messages. When in use, the liquid crystal display displays a light spot corresponding to one of the status messages, allowing a user to directly read the corresponding status message through the location of the light spot.

5 Claims, 4 Drawing Sheets

HMI DEVICE OF AC/DC POWER SUPPLY OR CONTROLLER

FIELD OF THE INVENTION

The present invention relates to a human-machine interface (HMI), and more particularly, to a HMI device for an AC/DC power supply or controller.

BACKGROUND OF THE INVENTION

With the development of industrial automation, human-machine interfaces have been widely used in many equipment/machines. Human-machine interface (HMI), also known as operator interface (OI). The main function of the human-machine interface is to provide an interface between human and equipment/machine for displaying the system's process or set status, alarm, lock, and other related information in text, digital, or graphical form.

The human-machine interface has buttons, switches and indicator lights in various colors, sizes and appearances for operation of the equipment and displaying the operating status, such as power on and off, etc., and can be used as an auxiliary explanation through a flat panel display (FPD), so that the operator can learn more about the necessary status of the equipment, or the information is sent to the operator for reference. Liquid crystal displays (LCD) are the main type of displays commonly used nowadays. A human-machine interface module is formed by integrating the above-mentioned buttons, switches, indicator lights or displays together.

However, when the HMI is used in equipment with a small panel, such as an AC/DC power supply or controller in a rack unit (1U), especially when the area of air inlets is to be maximized, the usage area of the HMI is relatively decreased. In the design of human-machine interfaces for displays, how to achieve clear, easy-to-read and high recognition within the limited area of a display has been a topic of improvement for the industry.

Accordingly, the inventor of the present invention has devoted himself based on his many years of practical experiences to solve these problems.

SUMMARY OF THE INVENTION

The primary object of the present invention is to provide a human-machine interface device of an AC/DC power supply or controller, which utilizes a small display that is a clear display, is easy to read, and has a high degree of recognition.

In order to achieve the foregoing object, the present invention provides a human-machine interface device of an AC/DC power supply or controller, comprising a human-machine interface module and a film. The human-machine interface module is mounted on a panel of the AC/DC power supply or controller. A front of the human-machine interface module has a liquid crystal display. The film is located in front of the human-machine interface module and attached to the panel of the AC/DC power supply or controller. The film has a transparent window corresponding to the liquid crystal display. The window is located on the liquid crystal display. The film further has a status indication region adjacent to an outer side of the window. The status indication region is marked with a plurality of different status messages. When in use, the liquid crystal display displays a light spot corresponding to one of the status messages, allowing a user to directly read the corresponding status message through the location of the light spot.

DETAILED DESCRIPTION OF THE PREFERRED EMBODIMENTS

Embodiments of the present invention will now be described, by way of example only, with reference to the accompanying drawings.

Figure 1:
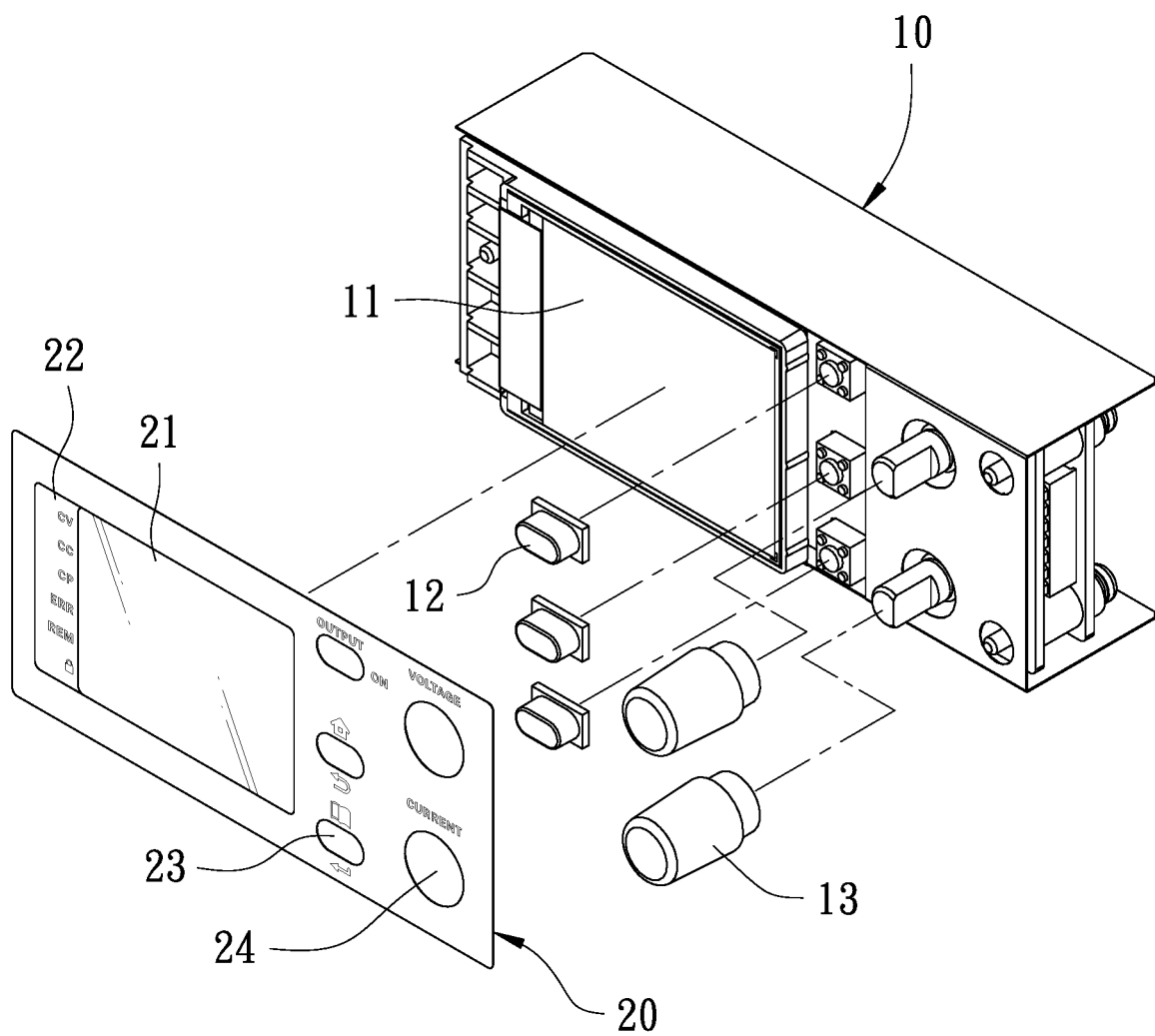
FIG. 1 is an exploded view of a preferred embodiment of the present invention.

FIG. 1 is an exploded view of a preferred embodiment of the present invention. The present invention discloses a human-machine interface device of an AC/DC power supply or controller, comprising a human-machine interface module 10 and a film 20.

The human-machine interface module 10 is mounted on a panel of an AC/DC power supply or controller. The front of the human-machine interface module 10 has a rectangular liquid crystal display 11. The liquid crystal display 11 consists of a certain number of light-emitting pixels. The human-machine interface module 10 includes a plurality of buttons 12 and a plurality of knobs 13 at one side of the liquid crystal display 11 for the user to operate the human-machine interface.

The film 20 is made of plastics. The film 20 is located in front of the human-machine interface module 10 and has a rectangular shape. The film 20 is attached to the panel of the AC/DC power supply or controller. The film 20 has a transparent window 21 corresponding to the liquid crystal display 11. The window 21 is located on the liquid crystal display 11. The film 20 further has a status indication region 22 adjacent to the outer side of the window 21. In this embodiment, the status indication region 22 is located at a vertical side of the window 21. The status indication region 22 is of the same color as the liquid crystal display 11, so that the status indication region 22 seems to be a part of the liquid crystal display 11. The status indication region 22 is marked with a plurality of different status messages. The status messages are arranged vertically for users to read the current status of the machine. In this embodiment, the status messages include CV (constant voltage), CC (constant current), CP (constant power), ERR (error), REM (remote control), lock symbol (lock), and the like. The film 20 has a plurality of elongate holes 23 and a plurality of circular holes 24 corresponding to the shapes of the buttons 12 and the knobs 13, respectively.

In order to further understand the structural features, technical means and expected effects of the present invention, the usage and operation of the present invention are described below.

Figure 2:
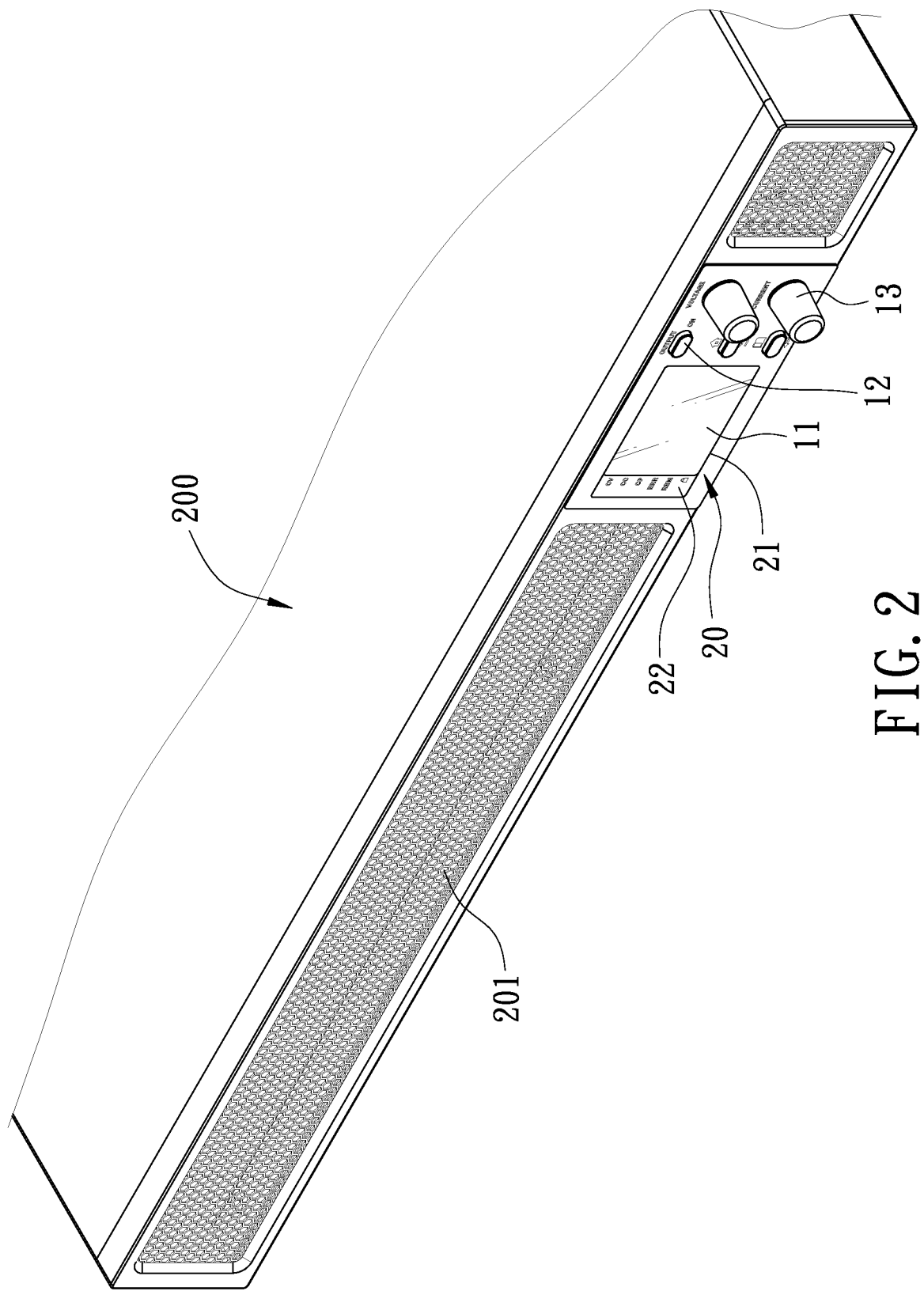
FIG. 2 is a schematic view of the preferred embodiment of the present invention mounted to a power supply.

FIG. 2 is a schematic view of the present invention mounted to a power supply. The human-machine interface module 10 is mounted on a panel 201 of an AC/DC power supply or controller 200, and the liquid crystal display 11 is exposed on the front of the panel 201. The film 20 is attached to the panel 201. The window 21 of the film 20 corresponds in position to the liquid crystal display 11. The elongate holes 23 and the circular holes 24 correspond in position to the buttons 12 and the knobs 13, respectively. In this way, the assembly of the present invention on the panel 201 of the AC/DC power supply 200 is completed.

Figure 3:
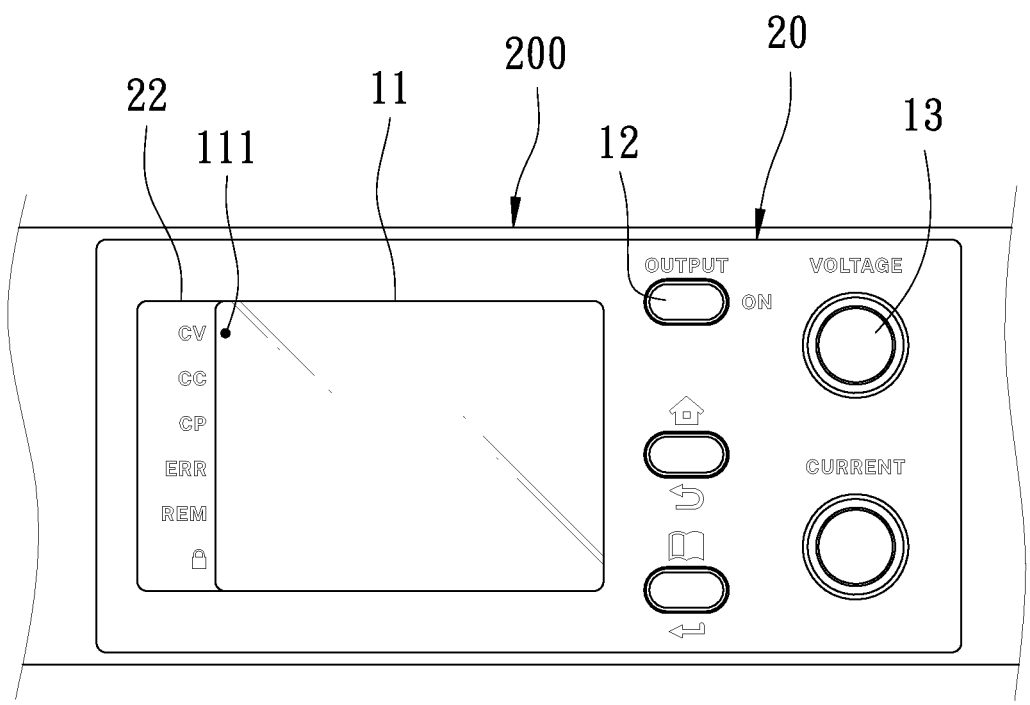
FIG. 3 is a schematic view of the preferred embodiment of the present invention set at a constant voltage.

FIG. 3 is a schematic view of the preferred embodiment of the present invention set at a constant voltage. When the user wants to set the AC/DC power supply 200 to be in a constant voltage state, the user operates the corresponding button 12 or knob 13 for operation of the liquid crystal display 11, such that the liquid crystal display 11 displays a light spot 111 close to the status indication region 22 and corresponding in position to the status message, CV (constant voltage). The light spot 111 is a circular light-emitting spot composed of multiple pixels, so that the light spot 111 has a larger light-emitting area and brightness. At this time, the user can quickly read the status message, CV (constant voltage), through the location of the light spot 111.

Figure 4:
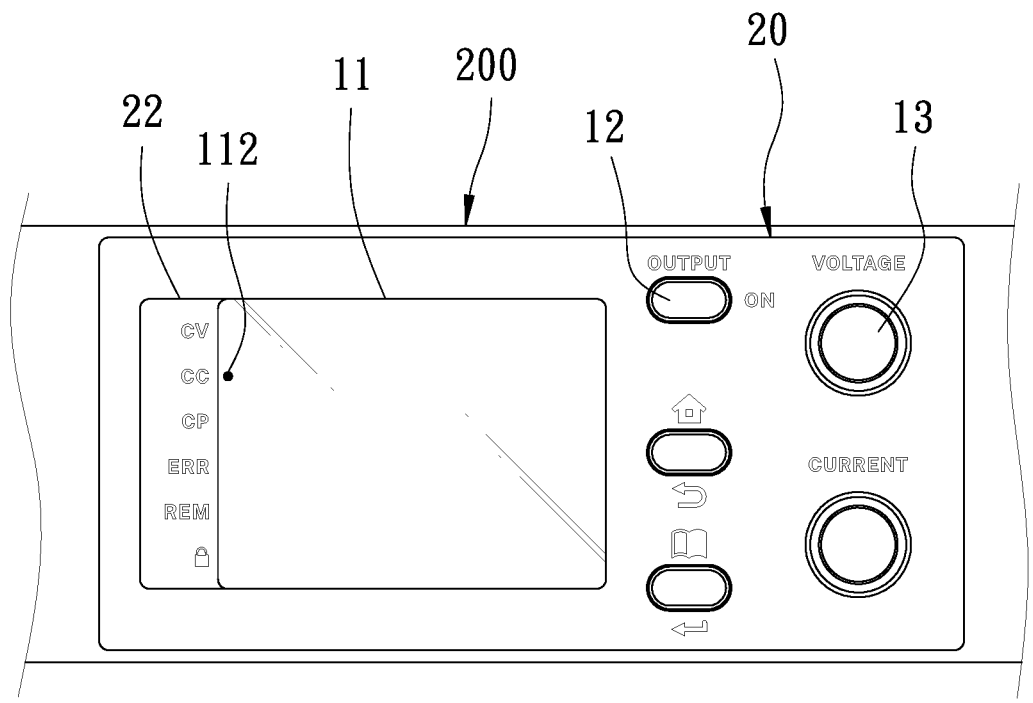
FIG. 4 is a schematic view of the preferred embodiment of the present invention set at a constant current.

FIG. 4 is a schematic view of the preferred embodiment of the present invention set at a constant current. When the user wants to set the AC/DC power supply 200 to be in a constant current state, the user operates the corresponding button 12 or knob 13 for operation of the liquid crystal display 11, such that the liquid crystal display 11 displays a light spot 112 close to the status indication region 22 and corresponding in position to the status message, CC (constant current). The light spot 112 is composed of multiple pixels. At this time, the user can quickly read the status message, CC (constant current), through the location of the light spot 112.

It is worth mentioning that when the user wants to reset the AC/DC power supply to be remotely controlled or locked, the user operates the corresponding button 12 or knob 13, and the liquid crystal display 11 displays a light spot corresponding in position to the status message, REM (remote control) or lock symbol (lock) for the user to read the status message, REM (remote control) or lock symbol (lock). In addition, when the machine malfunctions, the user can read the status message, ERR (error) through the location of the light spot, so that the user can troubleshoot as soon as possible.

As can be seen from the above description, the present invention integrates the display, buttons and knobs of the human-machine interface into the human-machine interface module. With the design of the status indication region corresponding to the light spot, the liquid crystal display can save pixels used for status messages and provide more other pixels for displaying values such as voltage, current, or other data. Thus, the display is clear, easy to read and highly recognizable within the limited area of the display.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A human-machine interface device of an AC/DC power supply or controller, comprising:
   a human-machine interface module, mounted on a panel of the AC/DC power supply or controller, a front of the human-machine interface module having a liquid crystal display;
   a film, located in front of the human-machine interface module and attached to the panel of the AC/DC power supply or controller, wherein the film has a transparent window corresponding to the liquid crystal display, the window is located on the liquid crystal display, the film further has a status indication region adjacent to an outer side of the window, and the status indication region is marked with a plurality of different status messages;
   wherein when in use, the liquid crystal display displays a light spot corresponding to one of the status messages, allowing a user to directly read the corresponding status message through the location of the light spot.

2. The human-machine interface device of the AC/DC power supply or controller as claimed in claim 1, wherein the status indication region is located at a vertical side of the window, and the status messages are arranged vertically.

3. The human-machine interface device of the AC/DC power supply or controller as claimed in claim 1, wherein the status messages include CV (constant voltage), CC (constant current), CP (constant power), ERR (error), REM (remote control), and lock.

4. The human-machine interface device of the AC/DC power supply or controller as claimed in claim 1, wherein the status indication region has a color same as that of the liquid crystal display.

5. The human-machine interface device of the AC/DC power supply or controller as claimed in claim 1, wherein the light spot is a circular light-emitting spot composed of multiple pixels.

\* \* \* \* \*